Nov. 3, 1953 W. ARROW 2,657,462
EDENTULOUS AND PARTIALLY EDENTULOUS DEMONSTRATIONAL
AND EDUCATIONAL MODEL
Filed June 30, 1952

INVENTOR.
WILLIAM ARROW
BY
HIS ATTORNEY.

Patented Nov. 3, 1953

2,657,462

UNITED STATES PATENT OFFICE 2,657,462

EDENTULOUS AND PARTIALLY EDENTULOUS DEMONSTRATIONAL AND EDUCATIONAL MODEL

William Arrow, Chicago, Ill.

Application June 30, 1952, Serial No. 296,394

4 Claims. (Cl. 32—71)

This invention relates to edentulous and partially edentulous demonstrational and educational models especially designed for educational and display purposes in the field of implant dentistry.

An object of the invention is to provide a model of the character hereinafter described which is principally designed to illustrate the following phases of prosthetic dentistry:

(a) Implanted denture work: full upper, full lower, or partials on either the upper or lower jaw;

(b) To simulate the anatomical conditions of the bone as found underneath the mucous membrane, and which is imperative for implant work exhibits;

(c) To simulate the mucous membrane (so-called "gums") both in texture and color, and adapted in such a way that an incision made through the resilient material will reveal the bone structure;

(d) The tissue-imitating material can be retracted to allow exposure of the bone (ridge and immediate adjacent area, the palate, in the case of an upper jaw), and thus be able to take an impression of the bone, construct an implanted appliance and insert it in position, suturing the incisions afterward if desired, or exposing the frame-work for visual education;

(e) A custom-made partially edentulous model will involve removable teeth adapted to be seated in sockets.

Yet another and equally important object of this invention is the provision of a demonstrational and educational model comprising two intimate and/or fused body sections, one of relatively hard acrylic material such as is used in the forming of dentures, and the other of a rubberlike material of pliable consistency capable of being easily incised and folded back or retracted from the hard body section.

Another and equally important object of the invention is to provide an edentulous or partially edentulous demonstrational and educational model imitating the natural conditions in the oral cavity in both color and structure and comprising a relatively hard body section having fused or otherwise fixed intimately thereto a pliable simulated gum structure, between which is confined (if the model represents the maxilla-palatial structure) the hard and anatomically simulated bone structure of the palate.

Other objects will appear hereinafter.

The invention consists in the novel combination and arrangement of parts to be hereinafter described and claimed.

The invention will be best understood by reference to the accompanying drawings showing the preferred form of construction, and in which.

Figure 4:
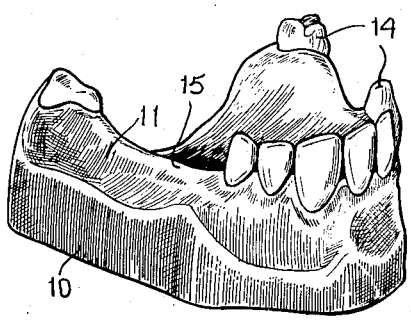
Fig. 4 is a perspective view of a model similar to that shown in Figs. 1 and 2, but illustrating a partially edentulous model.

My demonstrational and educational model may take the form of an edentulous type of either the upper or the lower oral cavity structure, or it may be partially edentulous as shown in Fig. 4. In either case, the model comprises two body sections 10 and 11, the body section 10 being formed of relatively hard material such as dental acrylic used by most dentists in the making of dentures, and the body section 11 being formed of a rubberlike material of pliable consistency capable of being easily incised for reasons which will be presently apparent. These body sections are intimately connected together by fusing or otherwise, to form a complete unitary structure. This structure in its finished state has the consistency and color of the oral cavity, imitating the natural conditions of such cavity. By forming the body section 10 of relatively hard material, such as acrylic, handling of the model is greatly facilitated during demonstration and use of the same.

Figure 1:
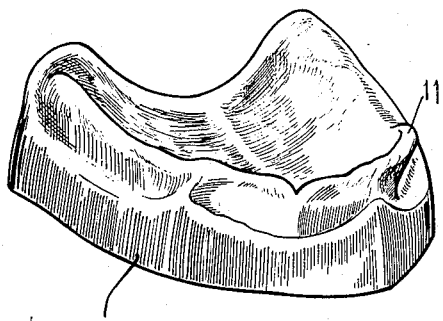
Fig. 1 is a perspective view of the invention prior to demonstration.
Figure 2:
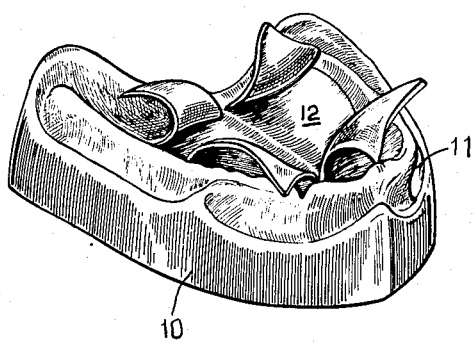
Fig. 2 is a perspective view similar to Fig. 1, but showing the same as having been used to demonstrate a part thereof.
Figure 3:
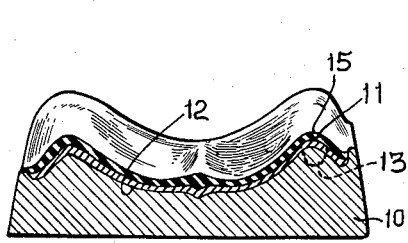
Fig. 3 is a cross sectional detail view of the invention as illustrated in Fig. 1.

The body section 11 represents the mucosa (gums); the body section 10 may properly be said to constitute a base. Beneath the body section 11 and embedded in such base, is a hard bone structure 12 anatomically simulating the palatal bone structure of the oral cavity (see Figs. 2 and 3). When the model takes the form shown in Fig. 4, there may be provided in the body sections 10 and 11, through the bone structure 12, sockets indicated in dotted lines at 13, to receive the roots of the teeth 14.

The model is capable of use to illustrate the several phases of prosthetic dentistry hereinbefore referred to. The pliable body 11 may have portions thereof incised in such a manner as will permit the incised portions to be folded back or retracted to expose the bone structure 12. Likewise the gum portion 15 of such body section 11 may be incised to expose the roots of the teeth 14. By the use of such model, the otherwise hidden features, or features difficult to be observed by a student, may be brought physically to the attention of the student or patient. Also by the use of such model, correct surgical technique may be devised and illustrated and demonstrated to a student or other observer.

My improved demonstrational and educational model is especially useful for visual educational purposes and the model may take one of many forms, without regard to shape, size or form.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A demonstrational and educational edentulous model comprising at least two body sections intimately connected together, one constituting a base and formed of relatively hard material with respect to said other section and said other section formed of a pliable material capable of being incised and retracted from the base, and a simulated bone structure embedded between said body sections.

2. A demonstrational and educational edentulous model comprising at least two body sections intimately connected together, one constituting a base and formed of relatively hard material with respect to said other section and said other section formed of a pliable material capable of being incised and retracted from the base, said body sections simulating in texture and color the mucosa and uvula as found in the oral cavity, and a simulated bone structure embedded between said body sections.

3. A demonstrational and educational edentulous model comprising at least two body sections intimately connected together, one constituting a base and formed of relatively hard material with respect to said other section and said other section formed of a pliable material capable of being incised and retracted from the base, and a simulated bone structure embedded between said body sections, said body sections having one or more sockets formed therein in which teeth may be mounted.

4. A demonstrational and educational edentulous model comprising at least two body sections intimately connected together, one constituting a base and formed of relatively hard material with respect to said other section and said other section formed of a pliable material capable of being incised and retracted from the base, said body sections simulating in texture and color the mucosa and uvula as found in the oral cavity, and a simulated bone structure embedded between said body sections, said body sections having one or more sockets formed therein in which teeth may be mounted.

WILLIAM ARROW.

References Cited in the file of this patent
UNITED STATES PATENTS

| Number | Name | Date |
|---|---|---|
| 1,045,920 | Wenker | Dec. 3, 1912 |